United States Patent
Kim et al.

(10) Patent No.: US 8,056,109 B2
(45) Date of Patent: Nov. 8, 2011

(54) SYSTEM AND METHOD FOR TRANSMITTING BROADCAST CONTENTS OVER DLNA NETWORK

(75) Inventors: Chul Seung Kim, Seoul (KR); Ho Chul Shin, Suwon-si (KR); Young Kyu Bae, Suwon-si (KR); Yun Je Oh, Yongin-si (KR); Joon Oo Kim, Suwon-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 292 days.

(21) Appl. No.: 11/481,446

(22) Filed: Jul. 6, 2006

(65) Prior Publication Data
US 2007/0250870 A1 Oct. 25, 2007

(30) Foreign Application Priority Data
Apr. 7, 2006 (KR) .......................... 10-2006-0031886

(51) Int. Cl.
*H04N 7/173* (2006.01)
(52) U.S. Cl. ............ 725/112; 725/80; 725/81; 725/132; 725/133; 725/141
(58) Field of Classification Search .................. 725/80, 725/81, 86, 112, 132, 133, 140, 141
See application file for complete search history.

(56) References Cited

U.S. PATENT DOCUMENTS

| | | | |
|---|---|---|---|
| 7,028,331 B2 * | 4/2006 | Schwalb ........................ | 725/140 |
| 2003/0065803 A1 * | 4/2003 | Heuvelman .................... | 709/231 |
| 2004/0031058 A1 * | 2/2004 | Reisman ........................ | 725/112 |
| 2004/0049797 A1 * | 3/2004 | Salmonsen .................... | 725/132 |
| 2005/0246747 A1 * | 11/2005 | Braun et al. .................... | 725/81 |
| 2006/0080720 A1 * | 4/2006 | Carro ............................. | 725/113 |
| 2006/0161635 A1 * | 7/2006 | Lamkin et al. ................ | 709/217 |
| 2007/0005783 A1 * | 1/2007 | Saint-Hillaire et al. ....... | 709/230 |
| 2007/0157267 A1 * | 7/2007 | Lopez-Estrada ................ | 725/90 |
| 2007/0250872 A1 * | 10/2007 | Dua ................................ | 725/81 |

FOREIGN PATENT DOCUMENTS
KR 2005-62275 6/2005
* cited by examiner

*Primary Examiner* — Kieu Oanh Bui
(74) *Attorney, Agent, or Firm* — Cha & Reiter, LLC

(57) ABSTRACT

The present invention relates to a system and method for retransmitting high definition contents broadcasted on a plurality of channels to IP-supported devices such as a digital media player (DMP), a mobile phone, personal computer (PC), etc. which are connected through a DLNA network. The method for retransmitting the broadcasted high definition contents includes the steps of generating a virtual item by converting channel information for a digital TV broadcast into an Extensible Markup Language (XML) file format, transmitting the virtual item to the DMP, determining whether there is a request for a personal TV service (PTS) from the DMP, tuning to a channel corresponding to the PTS if there is the request for the PTS, storing and packetizing a digital TV broadcast stream received through the PTS channel, and transmitting the packetized digital TV broadcast stream to the DMP.

10 Claims, 5 Drawing Sheets

SYSTEM AND METHOD FOR TRANSMITTING BROADCAST CONTENTS OVER DLNA NETWORK

CLAIM OF PRIORITY

This application claims the benefit of the earlier filing date, pursuant to 35 USC 119, that that patent application entitled "SYSTEM AND METHOD FOR TRANSMITTING BROADCAST CONTENTS OVER DLNA NETWORK," filed in the Korean Intellectual Property Office on Apr. 7, 2006 and assigned Serial No. 2006-0031886, the contents of which are incorporated herein by reference.

BACKGROUND OF THE INVENTION

1. Field of the Invention

The present invention relates to a digital living network alliance (DLNA) network and, in particular, to a system and method for transmitting high quality contents broadcasted on a plurality of channels to Internet Protocol (IP) communication-supported devices such as a digital media player (DMP), a mobile phone, personal computer (PC), and etc. which are connected through the DLNA network.

2. Background of the Related Art

Home networking technologies are rapidly developed such that consumer electronics and mobile and PC devices are interoperating in a home to enhance and enrich a user experiences with various services. In order to allow for the interoperability of the household appliances, various middleware, such as Universal Plug and Play (UPnP), Home Audio/Video Interoperability (HAVI), Java Intelligent Network Infrastructure (JINI), Video Electronics Standard Association (VESA), Digital Living Network Alliance, etc., protocols have been developed and are in the process of being adopted.

Among the middlewares, the DLNA formerly called the Digital Home Working Group (DHWG), is an alliance of leading corporate members including, Microsoft (MS), IBM, HP, Intel, Sony, Matsushita, Samsung, etc., established in June 2003. The aim of the DLNA is to align the companies and have industry standards that will allow products from all companies to be compatible and to enable a network of electronic devices such as TV, VCR, digital camera, and audio components in the home. Also, the DLNA has focused on the interoperability between networked entertainment and media devices for personal media uses involving imaging, audio and video.

The DLNA further defines a PC Internet Network where PC and PC peripherals such as a printer may communicate; a Mobile Network of multimedia mobile phones, personal digital assistants (PDAs), MP3 players, laptop computers, and other similar devices provides unparalleled connectivity and freedom of movement into and out of the home environment; a consumer electronic (CE) network of set-top boxes and traditional consumer electronics. Also, to deliver interoperability in the digital home, DLNA has focused on the industry collaboration, standards-based interoperability, and compelling products.

One of the key issues of the DLNA is media management and control that enable devices and applications to identify, manage, and distribute media contents across the stationary home network, or to transmit the identification, management and distribution to mobile device. UPnP Audio/Video (AV) technology addresses all of these needs for the home network and is the media management and control solution for devices developed according to the DLNA interoperability guidelines. Accordingly, DLNA has developed the physical media, network transports, media formats, streaming protocols and digital rights management mechanisms on the basis of UPnP.

The Internetworking for home network according to DLNA is based on Internet Protocol (IP), which provides underlying network communication for devices on the Internet and allows applications running over different media to communicate transparently.

For example, a PC or an advanced set top box (STB) may stream media contents to a TV in a master bedroom through an Ethernet cable to a 802.11 Access Point and then wirelessly to the TV. With IP, all the DLNA devices can communicate with other devices located anywhere around the world through the Internet.

DLNA is likely to be implemented with a wired fast Ethernet (802.11u) and wireless Ethernet (802.11a/b/g) as the physical layer. The wired Ethernet has a proven stability already and the use of wireless Ethernet, i.e., Wi-Fi for wireless home networking is already widely spread.

DLNA is implemented on the basis of UPnP AV architecture and UPnP Device architecture which is used for locating and controlling devices across the DLNA network, i.e., automatically configuring the IP address and recognizing other devices on the network with reference to the IP address, as well as checking and managing services to be provided.

In the meantime, the home network device category is made up of five Device Classes that share system usages in the home network with the same media format and network connectivity requirements. Among them, Digital Media Server (DMS) devices make roles, like the Media Server Device in the UPnP AV specification, for providing media acquisition, recording, storage, and sourcing capabilities, as well as content protection enforcement as required, and Digital Media Player (DMP) devices make roles, like the Media Render Device (MRD) and the Media Renderer Control Point (MRCP), for finding, selecting, and controlling to playback contents exposed by a DMS.

Figure 1:
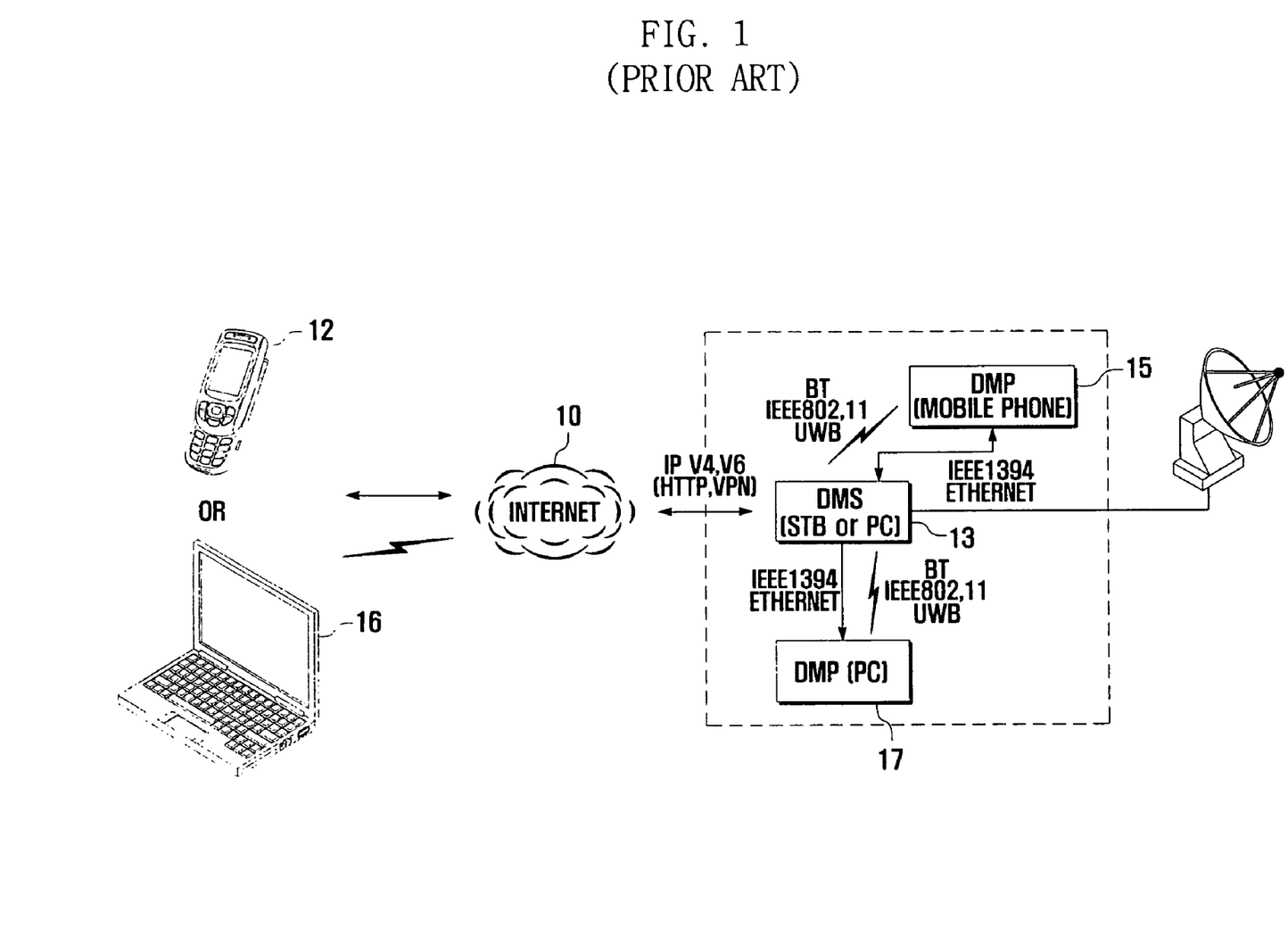
FIG. 1 is a block diagram illustrating a conventional DLNA system to which the present invention is adopted.

FIG. 1 is a block diagram illustrating a conventional DLNA system to which the present invention is adopted. As shown in FIG. 1, the DLNA system includes a digital media server (DMS) 13 for providing multimedia contents and Digital Media Players (DMPs) 15 and 17 which playback the multimedia contents provided by the DMS 13. The DMS 13 and the DMPs 15 and 16 communicate through Ethernet or IEEE 1394 as wired connections or Bluetooth (BT), IEEE 803.11, or Ultra Wide Band (UWB) as wireless connections. The DMS 13 uses IPv4 or IPv6 for providing contents to the DMP such as mobile phone or personal media player (PMP) 12 and PC or laptop computer 16 through Internet 10 using wired and/or wireless connections. Typically, DMP is a device having both the wired and wireless communication modules. Also, the DMP can have a home gateway function and a control point (CP) function in the home network.

The DMP can be a PC or a mobile phone or the DMS can be a set top box or a network PC such that the DMS 13 retransmits the general broadcast contents to the DMP 15 and 17 through wired or wireless links inside the home or outside wherever IP communication is possible.

In case of retransmitting the TV broadcasting signal to the DMP 15 and 17, the analog TV signal can be retransmitted to the PC using a Sling box method or after converting the signal in a legacy AV device. In this case, the TV or set top box is controlled by the Infra Red (IR) signal.

However, the conventional contents retransmitting method has drawbacks in that it cannot support the high definition (HD) contents or degrades the quality even if it may support HD transmit. In addition, additional configuration for retransmitting the contents in IP environment is needed.

Also, the conventional method is inconvenient in that the DLNA compliant devices are continuously updated since all the AV devices are not compliant to the DLNA, and the devices can be manipulated in a range of IR control around the TV or set top box. Furthermore, in order to playback the retransmitted contents in the PC, a PC program dedicated to such contents should be installed previously.

SUMMARY OF THE INVENTION

The present invention provides a method for retransmitting broadcast contents which is capable of transmitting HD contents across a DLNA network in the home and outside the home after transcoding.

One aspect of the present invention is to provide a method for transmitting broadcast contents, which is capable of switching channels using virtual items such that a DMP supports the personal TV service (PTS).

Another aspect of the present invention is to provide a method for transmitting broadcast contents, which is capable of performing rendering-control such as volume and screen settings manipulation on the DLNA network without an additional control channel such as IR.

It is still another aspect of the present invention is to provide a method for transmitting broadcast contents, which allows mobile terminals or PCs to receive PTS even at locations outside the home using a virtual private network (VPN) and transcoding technique.

The above objects are achieved by a method and system for transmitting digital TV broadcast contents to digital media player (DMP) for personal TV service (PTS) on a digital living network alliance (DLNA) network, according to the present invention.

In one aspect of the present invention, a method for transmitting digital TV broadcast contents includes the steps of generating a virtual item of a broadcast channel information for the PTS, transmitting the virtual item to the DMP, tuning in to a channel of the PTS according to a request for the PTS, and transmitting broadcast contents received through the channel to the DMP.

In another aspect of the present invention, a method for transmitting digital TV broadcast contents includes the steps of generating a virtual item by converting channel information for a digital TV broadcast into an Extensible Markup Language (XML) file format, transmitting the virtual item to the DMP, determining whether or not there is a request for a personal TV service (PTS) from the DMP, tuning to a channel corresponding to the PTS if there is the request for the PTS, storing and packetizing a digital TV broadcast stream received through the PTS channel, and transmitting the packetized digital TV broadcast stream to the DMP.

Preferably, the method further includes the step of storing the channel information converted into the XML file format in a form of content directory service so as to contain channel names, channel numbers, and additional information on the channels.

Preferably, the method further includes the step of parsing the channel information converted into the XML file format.

Preferably, the method further includes the steps of converting the virtual item into a content directory service (CDS) item of the DLNA and transmitting the CDS item to the DMP by a browser command.

Preferably, the method further includes the step of checking a uniform resource indicator for determining whether or not the CDS item is for the PTS.

In another aspect of the present invention, a system for transmitting digital TV broadcast contents includes an extensible markup language (XML) converter which converts information on a digital TV broadcast into an XML file format information, an exporter which generates a virtual item from the XML file format information and transmit the virtual item to the DMP, a checker which checks that there is a request for a personal TV service (PTS) from the DMP, a tuning controller which tunes in to a channel corresponding to the PTS when there is the request for the PTS, and a transmitter which stores and packetizes the digital broadcast stream received through the tuned channel and transmits the packetized digital broadcast stream to the DMP.

In still another aspect of the present invention, a system for transmitting digital TV broadcast contents includes a tuner for receiving a digital broadcast signal; a decoder which demodulates signals outputted from the tuner and separates video, voice, and data from the demodulated signals, a controller which converts and parses the signals outputted form the decoder for referring to channel information, generates virtual items of content directory service (CDS), transmits a CDS list to the DMP, checks a uniform resource identifier (URI) and tunes to a channel corresponding to the CDS when the DMP attempts to access for the CDS, stores and packetizes the broadcast data received through the channel, and transmits the packetized broadcast data to the DMPm a network interface which interfaces the DMP connected through a wired link inside or outside the home; a transceiver which interfaces the DMP connected wirelessly inside or outside the home; and a memory which store the channel information and the broadcast data.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Embodiments of the present invention will be described hereinafter with reference to the accompanying drawings in detail. Certain terminology will be used in the following description for convenience and reference only and will not be limiting. Reference will now be made in detail to the present embodiment of the invention, examples of which is illustrated in the accompanying drawing(s). Wherever possible, the same reference numbers will be used throughout the drawing(s) to refer to the same or like parts. Detailed descriptions of well-known functions and structures incorporated herein will be omitted when it many obscure the subject matter of the present invention.

Figure 2:
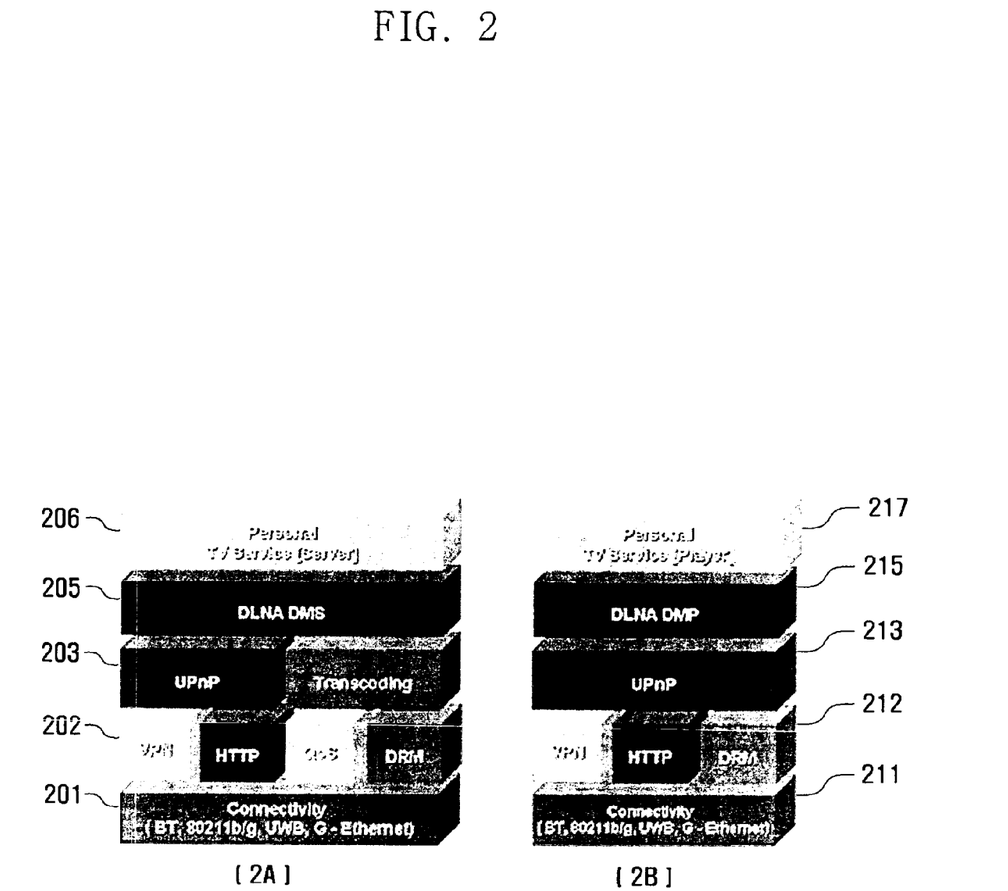
FIG. 2A and FIG. 2B are drawings illustrating protocol stacks of a DLNA network according to an embodiment of the present invention.

FIG. 2A and FIG. 2B are drawings illustrating protocol stacks of a DLNA network according to an embodiment of the present invention.

As shown in FIG. 2A and FIG. 2B, DMS 13 and DMP 15 and 17 of the DLNA network is implemented with a physical layer protocols such as Bluetooth (BT), IEEE 802.b/g, UWB, and G-Ethernet for wired and wireless connections. The media access control (MAC) layer 203 and 213 is provided with UPnP for the common interface of the DMS and DMP and the UPnP performs transcoding. The link layer 202 and 212 is provided with HTTP, VPN, QoS, and DRM, where QoS indicates the quality level of the contents (or Quality of Service) and digital right management (DRM) is associated with a pre-defined policies controlling access to the contents. The home control layer consists of DLNA and the application layer consists of Personal TV service (PTS).

Figure 3:
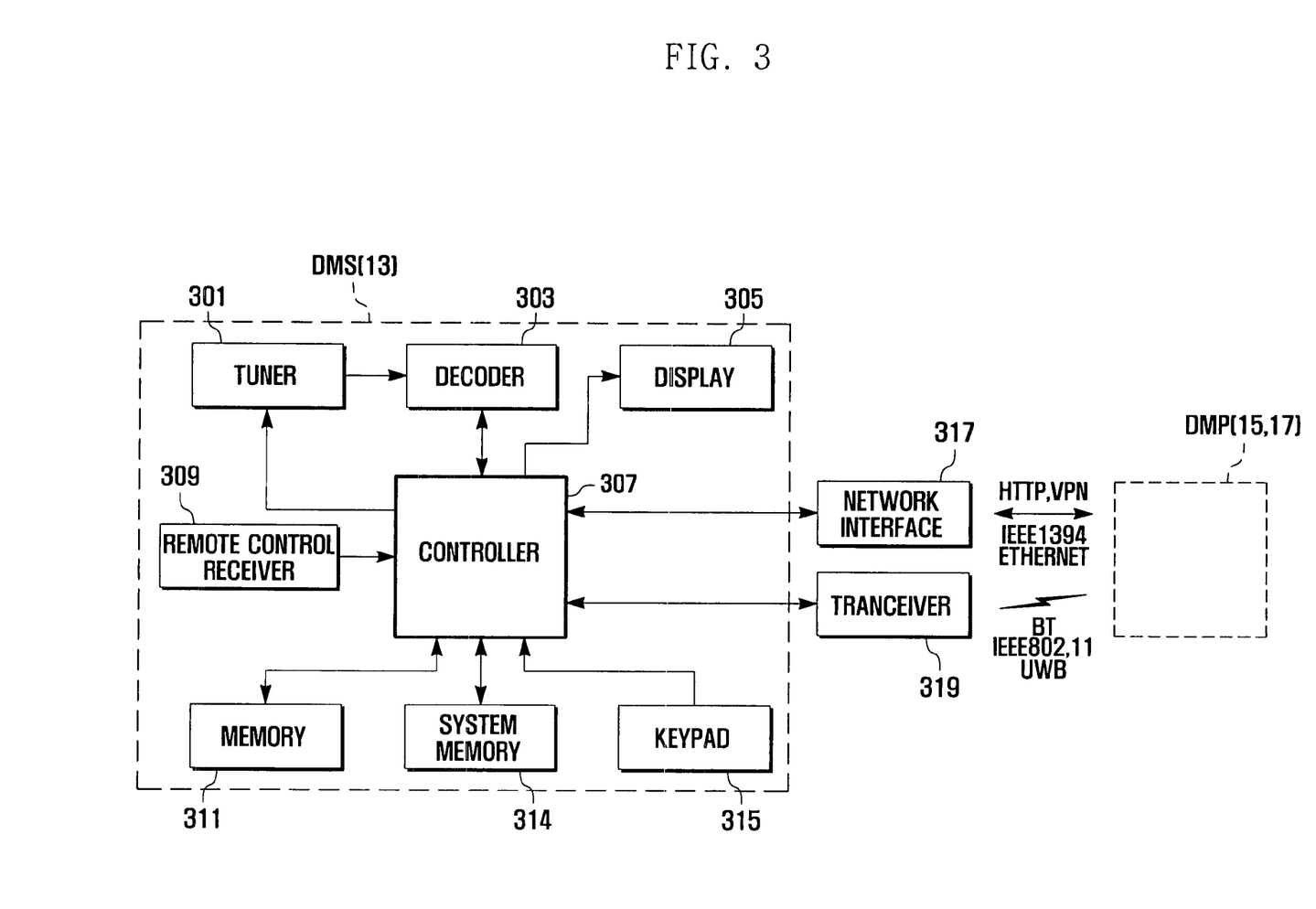
FIG. 3 is a block diagram illustrating a DMS according to an embodiment of the present invention.

FIG. 3 is a block diagram illustrating a DMS according to an embodiment of the present invention.

The DMS, which can be a network computer or a set top box includes a tuner 301 for receiving digital broadcast signals, a decoder 303 for demodulating the signal outputted from the tuner and dividing the signal into video, audio, and data signal, a controller 307 generating virtual items of content directory service (CDS) after converting channel information outputted from the decoder into Extensible Markup Lange (XML) file format and parsing the XML file, transmitting the CDS list to the DMP, tuning the channel by checking a Uniform Resource Identifier (URI) when the DMP accesses the PTS, receiving the broadcast data through the tuned channel and storing the received broadcast data, and packetizing the broadcast data and transmitting the packetized data to the DMP, a network interface 317 for interfacing the DMP connected through a wire inside or outside the home, a wireless transceiver 319 for interfacing the DMP connected wirelessly inside or outside the home, a system memory 314 for storing programs for operating the system of the set top box or the network computer, a memory 311 for storing the channel information and broadcast data received through the tuned channel, a remote control receiver 309 for receiving remote control signal, a display 305 for displaying operation status; and a keypad 315 for inputting instruction and information. In case of disabling the operations of the tuner 301 and the decoder 303, the network computer can be a DMS. The network interface 317 and the wireless transceiver 319 allow various household appliances and exterior device, i.e., DMP, to be connected.

Figure 4A:
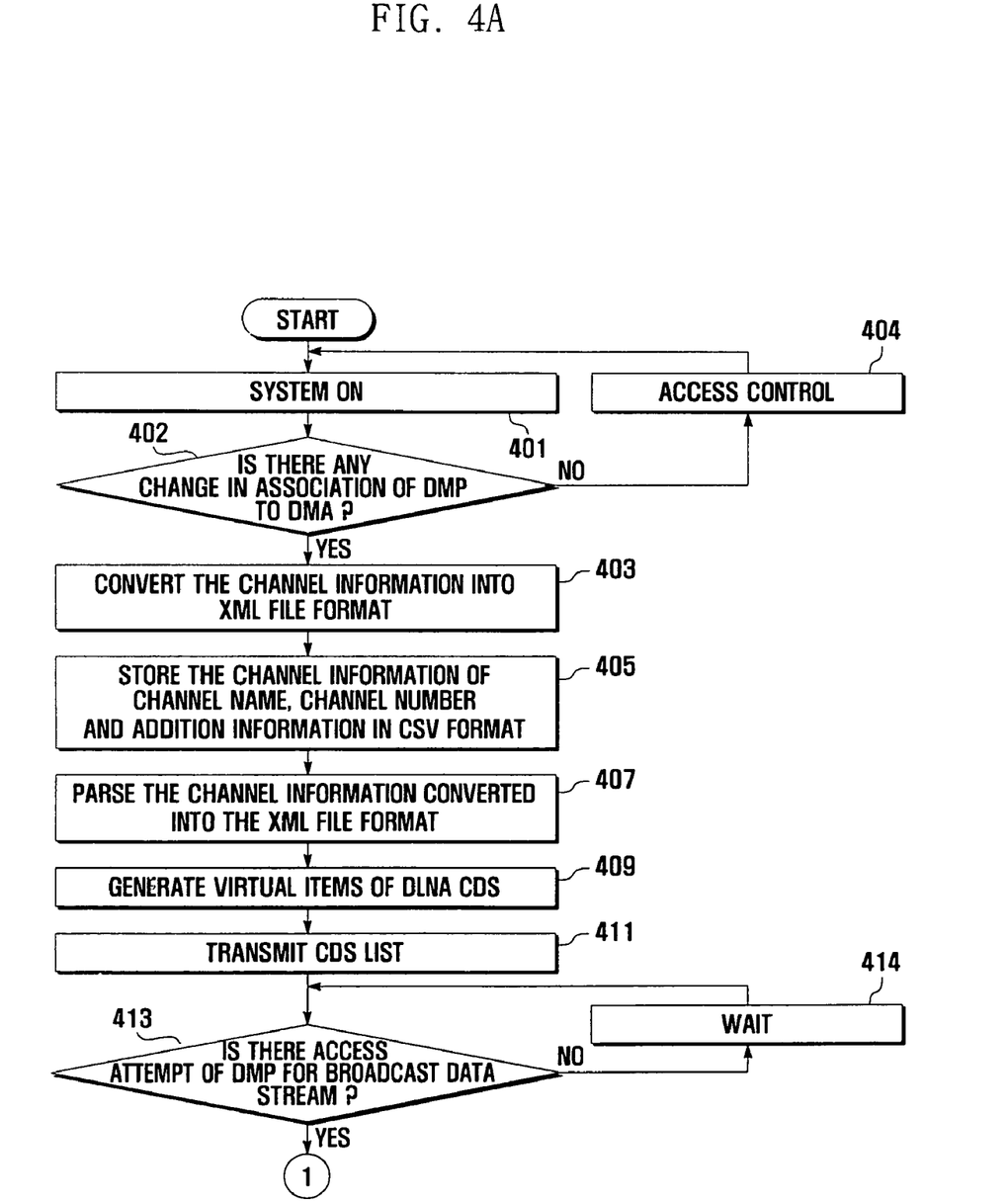
FIGS. 4A to 4B are flowcharts for illustrating a method for transmitting broadcast contents according to an embodiment of the present invention.
Figure 4B:
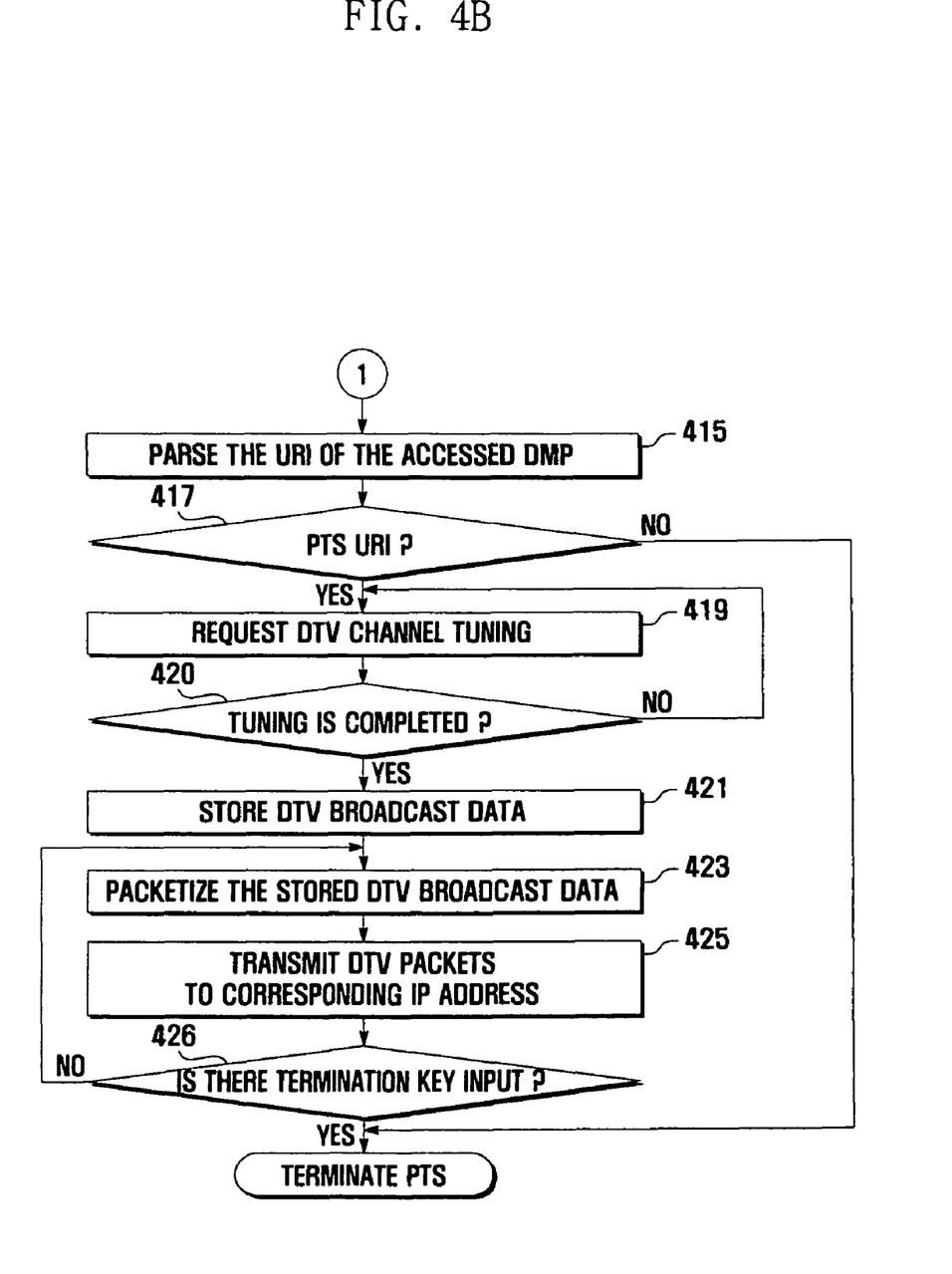

FIGS. 4A and 4B are flowcharts for illustrating a method for transmitting broadcast contents according to an embodiment of the present invention.

While a set top box as the DMS and a mobile terminal (like PDA or PMP) and a PC as the DMPs are turned on at step 401, the controller 307 checks the association with the DMPS to provide the PTS through the network interface 317 and the wireless transceiver 319 at step 402. And then the controller 307 receives channel information of the digital TV through the decoder 303 and converts the channel information into XML file format at step 403. The XML file format includes channel names field (ChannelName), e.g., SBS, KBS1, EBS, and the like, and channel numbers field (ChannelNumber), e.g., 6, 9, 13. The XML file format further includes additional information (ChannelDesc) on the channel, e.g., Test 1,2, constituted as a Comma Separate Value (CSV). The controller 307 stores the information into the memory 311 at step 405. The channel information is formatted as following XML file.

```
<ChannelInfo>
    <Channel>
```

-continued

```
<ChannelName>SBS</ChannelName>
<ChannelNumber>6</ChannelNumber>
    <ChannelDesc>test1=test2,test3=test4</ChannelDesc>
</Channel>
<Channel>
<ChannelName>KBSD-2</ChannelName>
<ChannelNumber>7</ChannelNumber>
    <ChannelDesc>test1=test2,test3=test4</ChannelDesc>
</Channel>
<Channel>
<ChannelName>KBSD-1</ChannelName>
<ChannelNumber>9</ChannelNumber>
    <ChannelDesc>test1=test2,test3=test4</ChannelDesc>
</Channel>
<Channel>
<ChannelName>EBSDTV</ChannelName>
<ChannelNumber>10</ChannelNumber>
    <ChannelDesc>test1=test2,test3=test4</ChannelDesc>
</Channel>
<Channel>
<ChannelName>MBCDTV</ChannelName>
<ChannelNumber>11</ChannelNumber>
    <ChannelDesc>test1=test2,test3=test4</ChannelDesc>
</Channel>
</ChannelInfo>
```

The channel information converted into the XML file format is parsed under the control of the controller 307 at step 407 and the parsed channel formation is processed so as to generate a virtual item for DLNA CDS at step 409. After adding the PTS channels as the items, the controller 307 exports the CDS list to each DMP together with the uniform Resource Identifier (URI) as following, at step 411.

```
<item id="pts0001#P20" refID="" parentID="20" restricted="1">
<dc:title>SBS</dc:title>
<res protocolInfo="http-get:*:video/
mpeg:DLNA.ORG_PN=MPEG_PS_NTSC"
>http://192.168.0.11:9000/pts/SBS.mpg?channel=6</res>
<upnp:class>object.item.videoItem.pts</upnp:class>
</item>
<item id="pts0002#P20" refID="" parentID="20" restricted="1">
<dc:title>KBSD-2</dc:title>
<res protocolInfo="http-get:*:video/
mpeg:DLNA.ORG_PN=MPEG_PS_NTSC"
>http://192.168.0.11:9000/pts/KBSD-2.mpg?channel=7</res>
<upnp:class>object.item.videoItem.pts</upnp:class>
</item>
<item id="pts0003#P20" refID="" parentID="20" restricted="1">
<dc:title>KBSD-1</dc:title>
<res protocolInfo="http-get:*:video/
mpeg:DLNA.ORG_PN=MPEG_PS_NTSC"
>http://192.168.0.11:9000/pts/KBSD-1.mpg?channel=9</res>
<upnp:class>object.item.videoItem.pts</upnp:class>
</item>
```

In case that the DMP attempts to access to the DMS for receiving PTS, the controller 307 of the DMS checks whether there is an attempt to access for receiving the PTS through the network interface 317 and the wireless transceiver 319 at step 413. If it is determined that there is no access attempt, the controller 309 waits. Otherwise, the controller 309 parses the URI of the DMP attempting the access at step 415. The controller 307 checks that the DMP requests the PTS on the basis of the parsed URI at step 417. The URI can be expressed as follows.

```
>
http://192.168.0.11:9000/pts/KBSD-2.mpg?channel=7
```

```
http://192.168.0.11:9000/pts/SBS.mpg?channel=6
http://192.168.0.11:9000/pts/KBSD-1.mpg?channel=9
```

The URI is used in the form of http and contains an address and access port of the DMS, PTS route, and channel number corresponding to the virtual item. In this embodiment the set top box is for retransmitting the ground wave broadcast such that it is possible to provide videos in higher quality and through more channels than those of the DMB.

In the meantime, after checking PTS at step 417, the control 307 of the DMS controls the tuner 30 so as to request the DTV to tune in the channel corresponding to the PTS. If it is checked, through the decoder 303, that the tuning is successfully completed, the controller 307 stores the inputted digital TV broadcast stream into the memory 311 at step 421 and packetizes the stored digital TV broadcast stream at step 423. The packetized stream is transmitted to the DMP of the corresponding IP address at step 425 and the transmission is continued until a termination key is pushed at step 426.

Accordingly, the PTS can be provided to DMPs associated to the DMS in IP connection regardless to the locations of the DMPs.

Even though DMS is implemented with an example of the set top box in this embodiment, it is not limited but can be implemented with TV set, VCR, and network PC capable of tuning to the PTS channel and obtaining the channel information in other manner.

As described above, the present invention can transmit the TV contents of the HD level in the home and retransmitting the TV contents out of the home by transcoding the TV contents. The TV contents are received through the ground wave broadcasting channel such that the quality of the contents are higher than that of the DMB and the number of service channel is greater than that of the DMB. Also, the method is implemented in the DIANA network environment, it is possible to use additional functions as well as the PTS without modification of the program and to provide the service to the devices located anywhere the IP communication is supported.

The above-mentioned methods and apparatus according to the present can be realized in hardware or as software or computer code that can be stored in a recording medium such as a CD ROM, an RAM, a floppy disk, a hard disk, or a magneto-optical disk or downloaded over a network, so that the method described herein can be executed by such software using a general purpose computer, or a special processor or in programmable or dedicated hardware, such as an ASIC or FPGA. While the present invention has been shown and described with reference to certain embodiments thereof, it will be understood by those skilled in the art that various changes in form and details may be made therein without departing from the spirit and scope of the invention as defined by the appended claims.

What is claimed is:

1. A method for transmitting digital TV broadcast contents to a digital media player (DMP) at a Digital Media Server (DMS) for personal TV service (PTS) on a digital living network alliance (DLNA) network, the method comprising the steps of:
   receiving a broadcast channel information the digital TV broadcast contents of a plurality of channels;
   generating virtual items individually corresponding to the channels for the PTS by converting the broadcast channel information, each of the virtual items comprising a Uniform Resource Identifier (URI using a hypertext transport protocol (http) and having an address and an access port number of the DMS, a route of the PTS, and a channel number corresponding to each of the virtual items;
   transmitting the virtual items to the DMP;
   tuning, if one of the URIs is accessed by the DMP through one of the virtual items, to one of the channels corresponding to the accessed URI;
   receiving the digital TV broadcast contents through the tuned channel;
   packetizing the received digital TV broadcast contents; and
   re-transmitting the packetized digital TV broadcast contents to the DMP in an Internet Protocol (IP) communication regardless of a location of the DMP.

2. The method of claim 1, wherein the step of generating the virtual items includes:
   converting the broadcast channel information into an extensible markup language (XML) file format information;
   parsing the XML file format information;
   generating a content directory service (CDS) items from the parsed XML file format information; and
   generating the virtual items by individually adding the URIs to the CDS items.

3. The method of claim 2, wherein each of the CDS items comprises a channel name, a channel number, and additional information on the channel for the PTS corresponding to each of the CDS items.

4. The method of claim 1, wherein the step of re-transmitting the packetized digital TV broadcast contents includes the step of:
   storing the packetized digital TV broadcast contents; and
   transmitting the packetized digital TV broadcast contents to the DMP.

5. The method of claim 4, wherein the step of re-transmitting the packetized digital TV broadcast contents transmits the stored digital TV broadcast contents into a home in a High Definition (HD) or retransmits the stored digital TV broadcast contents out of the home by transcoding the stored digital TV broadcast contents, which are received through a ground wave broadcasting channel.

6. A system for transmitting digital TV broadcast contents to a digital media player (DMP) at a Digital Media Server (DMS) for personal TV service (PTS) on a digital living network alliance (DLNA) network, comprising:
   a controller which receives a broadcast channel information on the digital TV broadcast contents of a plurality of channels, generates virtual items individually corresponding to the channels for the PTS by converting the broadcast channel information, each of the virtual items comprising a Uniform Resource Identifier using a hypertext transport protocol and having an address and an access port number of the DMS, a route of the PTS, and a channel number corresponding to each of the virtual items;
   a transmitter which transmits a the virtual items to the DMP under control of the controller; and
   a tuner which tunes, if one of the URIs is accessed by the DMP through one of the virtual items, to one of the channels corresponding to the accessed URI under the control of the controller and receives the broadcast contents through the tuned channel, and
   wherein the controller packetizes the received digital TV broadcast contents and controls the transmitter to re-transmit the packetized digital TV broadcast contents to the DMP in an Internet Protocol (IP) communication regardless of a location of the DMP.

7. The apparatus of claim 6, wherein the controller:
converts the broadcast channel information into an extensible markup language (XML) file format information,
parses the XML file format information,
generates content directory service (CDS) items from the parsed XML file format information, and generates the virtual items by individually adding the URIs to the CDS items.

8. The apparatus of claim 7, wherein each of CDS items comprising a channel name, channel number, and additional information on the channel for the PTS corresponding to the CDS items.

9. The apparatus of claim 6, further comprising:
a memory which stores the packetized digital TV broadcast contents under control of the controller.

10. The apparatus of claim 9, wherein the controller controls the transmitter to transmit the stored digital TV broadcast contents into a home in a High Definition (HD) or to retransmit the stored digital TV broadcast contents out of the home by transcoding the stored digital TV broadcast contents, which are received through a ground wave broadcasting channel.

* * * * *

UNITED STATES PATENT AND TRADEMARK OFFICE
CERTIFICATE OF CORRECTION

| | | |
|---|---|---|
| PATENT NO. | : 8,056,109 B2 | |
| APPLICATION NO. | : 11/481446 | |
| DATED | : November 8, 2011 | |
| INVENTOR(S) | : Chul Seung Kim et al. | |

It is certified that error appears in the above-identified patent and that said Letters Patent is hereby corrected as shown below:

Column 7, Claim 1, Line 62 should read
-- ...information on the digital... --

Column 8, Claim 6, Line 51 should read
-- ...Uniform Resource Identifier (URI) using... --

Column 8, Claim 6, Line 52 should read
-- ...transport protocol (http) and having... --

Signed and Sealed this
Seventeenth Day of July, 2012

David J. Kappos
*Director of the United States Patent and Trademark Office*